United States Patent [19]

Adadurov et al.

[11] Patent Number: 4,483,836
[45] Date of Patent: Nov. 20, 1984

[54] METHOD OF PRODUCING DIAMOND AND/OR DIAMOND-LIKE MODIFICATIONS OF BORON NITRIDE

[75] Inventors: Gennady A. Adadurov, Moscow; Tamara V. Bavina, Moskovskaya; Oleg N. Breusov, Moskovskaya; Viktor N. Drobyshev, Moskovskaya; Mikhail J. Messinev, Moscow; Alexandra I. Rogacheva; Alexandr V. Ananiin, both of Moskovskaya; Vladimir N. Apollonov, Moscow; Anatoly N. Dremin; Valentin N. Doronin, both of Moskovskaya; Fedor I. Dubovitsky, Moscow; Lidia G. Zemlyakova, Moskovskaya; Sergei V. Pershin, Moskovskaya; Viktor F. Tatsy, Moskovskaya, all of U.S.S.R.

[73] Assignee: Institut Khimicheskoi Fiziki Akademii Nauk SSSR, U.S.S.R.

[21] Appl. No.: 361,901

[22] PCT Filed: Jul. 31, 1980

[86] PCT No.: PCT/SU80/00136

§ 371 Date: Mar. 18, 1982

§ 102(e) Date: Mar. 18, 1982

[87] PCT Pub. No.: WO82/00458

PCT Pub. Date: Feb. 18, 1982

[51] Int. Cl.³ .............................................. C01B 21/064
[52] U.S. Cl. .................................... 423/290; 423/446; 204/157.1 S
[58] Field of Search ............... 423/446, 290, DIG. 11; 204/157.1 S; 156/DIG. 68, DIG. 86

[56] References Cited

U.S. PATENT DOCUMENTS 3,238,019  3/1966  De Carli ............................ 423/446
3,401,019  9/1968  Cowan et al. ..................... 423/446

FOREIGN PATENT DOCUMENTS

1373693  11/1974  United Kingdom ................ 423/290

Primary Examiner—John Doll
Assistant Examiner—Steven Capella
Attorney, Agent, or Firm—Lilling & Greenspan

[57] ABSTRACT

A method of producing diamond and/or diamond-like modifications of boron nitride from a material to be transformed, such material being carbon and/or boron nitride, with the use of explosive power, said explosive power being used by way of performing detonation of a charge comprising an explosive and a material to be transformed.

9 Claims, 1 Drawing Figure

METHOD OF PRODUCING DIAMOND AND/OR DIAMOND-LIKE MODIFICATIONS OF BORON NITRIDE

FIELD OF THE ART

The present invention relates to the art of producing superhard materials and more particularly to methods of producing diamond and/or diamond-like modifications of boron nitride.

DESCRIPTION OF THE PRIOR ART

Compression of substances by shock waves leads to the origination of high dynamic pressures and high temperatures and produces substances (target products) in the form of high-pressure phases featuring high hardness. Thus, shock compression of graphite to pressures exceeding 20 GPa produces a diamond (Science, vol. 133, No. 3467, published in June, 1961. American Association for the Advancement of Science, Washington), P. S. De Carlie, J. C. Jamieson "Formation of Diamond by Explosive Shock", pp. 1821–1822).

Impact compression of boron nitride to pressures exceeding 12 GPa produces a dense modification of this compound (Doklady Akademii Nauk SSSR, vol. 172, No. 5, published in February, 1967, "Nauka" Publishers, Moscow: C. A. Adadurov, Z. G. Aliev, L. O. Atovmyan, T. V. Bavina, Yu. G. Borodko, O. N. Breusov, A. N. Dremin, A. Kh. Muranevich, S. V. Pershin, "Formation of Wurtzite-like Modification of Boron Nitride through Impact Compression", pp. 1066–1068).

Methods are known in the art of producing superhard materials—diamond and/or diamond-like modifications of boron nitride, according to which materials to be transformed—graphite and/or hexagonal boron nitride are placed into sturdy metallic containers, so-called conservation ampoules, of flat or cylindrical type, in the walls of which shock waves are generated by detonating explosive charges found in contact with the walls of the ampoule, or by impacting the walls of such ampoules with bodies accelerated by detonation products to considerable speeds. Shock waves from the walls of the ampoules enter into the material being transformed and compress it until the required pressures and temperatures originate in it. For increasing the yield of the target product, other substances are usually added to the material being transformed, e.g. metals which upon impact compression are heated to a smaller extent than the resulting high-pressure phase (the target product). As a result, these additives reduce the temperature of the high-pressure phase and preclude annealing of said phase and its conversion to the initial state (U.S. Pat. No. 3,401,019, published on Sept. 10, 1068, Class 23-209.; UK Pat. No. 1,281,002, Class COIB 31/06, published on July 12, 1972).

Also known is a method of producing superhard materials, according to which shock waves in the mixture of the material to be transformed and cooling additions are generated by the detonation of a charge found in contact with the surface of the mixture, or by an impact on such surface by a body accelerated by the products of explosion. In this case the mixture of the initial phase with the cooling addition resides in the cavity of a solid and sturdy metallic support, preventing the substance being treated from scattering (UK Pat. No. 1,115,648, published on May 29, 1968, Class COIB 31/06).

All the known methods for creating high dynamic pressures and temperatures use impact compression to transform the materials, which are placed in solid metallic specially manufactured containers (ampoules), which are not reusable and are either demolished when opened or destroyed upon the explosion, as in the last-cited method. All the above-cited methods require labor-consuming operations for the manufacture and opening of the ampoules, as well as the consumption of large amounts of structural materials and explosives.

DISCLOSURE OF THE INVENTION

The present invention is directed to a method of producing diamond and/or diamond-like modifications of boron nitride from a material to be transformed—carbon and/or boron nitride through the use of explosive power, and conditions for the process which allow for the production of these superhard materials without the use of expendable conservation containers, and with less costly and simpler of the synthesis process equipment and instrumentation.

Said object is accomplished by a method of producing diamond and/or diamond-like modifications of boron nitride from a material to be transformed—carbon and/or boron nitride with the use of explosive power, the explosive power, according to the invention, being utilized by detonating a charge comprising an explosive and the material to be transformed.

In the method of the invention the charge is detonated in a hollow container manufactured from steel, tightened prior to the explosion, and having a volume to ensure a sufficient degree of expansion of gaseous detonation products and small residual gas pressures (1 to 5 atm). This makes the container non-expendable and reusable for as many as thousands and even dozens of thousands of times, ruling out the application of special expendable conservation ampoules, the consumption of structural materials thus being substantially reduced. The present invention also makes it possible to have a substantial reduction in the consumption of explosives (by a factor of 10 to 30), since the latter are in direct contact with the material to be transformed, and there is no necessity in creating shock waves of long duration, as in the prior art methods.

The present method also makes it possible:

(a) to obtain target products with a high yield (up to 20%);

(b) to purposefully obtain diamond powders featuring a uniform fractional composition, including submicron fractions with particles not over 1 $\mu$m in size, without additional operations of fractionation;

(c) to purposefully obtain diamond-like modifications of boron nitride—wurtzite or, mainly, cubic ones.

Superhard materials produced by the present method may be used both as abrasives and as starting materials for producing polycrystalline compacts from which cutting tools are manufactured.

According to the invention, materials to be transformed are subjected to the action of high dynamic pressures and high temperatures developing directly in the detonation wave of condensed explosives, namely in the front of the detonation wave, in the reaction zone, and in the detonation products containing, mainly, CO, $CO_2$, C, $H_2O$, and $N_2$.

In the present method the pressure and temperature ranges are determined by the qualitative and quantitative composition of the charge and depend mainly on the nature of the explosive, its power and density.

It is expedient to use as explosives, substances which upon detonation of a charge, provide dynamic pressures of 3 to 60 GPa and temperatures of 2000° to 6000° K. Such substances are, e.g. cyclotrimethylenetrinitramine (hexogen), cyclotetramethylenetetranitramine (octogen), trinitrotoluene (trotyl), trinitrophenylmethylnitramine (tetryl), pentaerythritol tetranitrate (PETN), tetranitromethane (TNM) or mixtures of said explosives. Maximum pressure is determined by the pressure in the chemical peak of the detonation wave, which for hexogen having a density of 1.8 g/cm$^3$ is 60 GPa. Minimum pressure is determined by the pressure in the end of the reaction zone, which for trotyl having a density of 0.8 g/cm$^3$ is 3.0 GPa. The above-cited temperature ranges are determined by the temperatures developed in the detonation of a high-power explosive with a minimum quantity of material to be transformed and in the detonation of a mixture of a high-power explosive with a maximum quantity of material to be transformed (F. A. Baum, L. P. Orlenko, K. P. Stanyukovich, V. P. Chelyshev, B. I. Shekhter, "Fizika vzryva"/'Physics of Explosion'/, published in 1975, "Nauka" Publishers, Moscow, pp. 97–125, 145–152).

It is essential that very high temperatures (4500 to 6000° K.) lead to melting the material to be transformed in the reaction zone, if this material is used in the form of a fine-dispersed fraction with particle sizes less than 1 μm, and to the obtaining of fine-dispersed fractions of desired products. It is also essential that in the flying asunder of the explosion products containing particles of the desired product their adiabatic cooling rate is ~10$^8$ deg/sec, thus substantially diminishing thermal annealing of the desired products and their graphitization.

The present method envisages the use of charges containing 30 to 99 mass % of an explosive and 1 to 70 mass % of a material to be transformed.

With a view to precluding chemical interaction of the material to be transformed with heated detonation products and to preserving the desired product in the detonation products, it is recommended that the charge contain, in addition to an explosive and the material to be transformed, also additives inert to the material to be transformed, which evaporate or decompose beyond the front of the detonation wave in an amount of 1 to 50% of the charge mass. Such inert additives as water, ice, liquid nitrogen, aqueous solutions of salts of metals, and crystal hydrates are decomposed or evaporated with absorption of heat, bring down the temperature of detonation products, and thus help to preserve the desired product in the detonation products. Such substances as ammonium salts, hydrazine, hydrazine salts, aqueous solutions of hydrazine salts, liquid or solid hydrocarbons, upon evaporation or decomposition yield gaseous products which are chemically inert to the material being transformed, and not only cool the detonation products, but dilute them, also contributing to the preservation of the desired product.

Moreover, the present method envisages the use of a charge, containing, in addition to an explosive and the material to be transformed, additives which are inert to the material to be transformed: metals or salts of metals having a density over 2.2 g/cm$^3$. In this manner the conditions of cooling the target product are improved, and the average pressure in the reaction zone is also increased, even if low-power explosives are employed. Moreover, if in said case the material to be transformed is graphite modification of carbon, it is possible to produce diamond with a bimodal distribution of particles according to their size (approximately 0.05 to 1.0 and 0.2 to 5.0 m).

The present method envisages the use of charge components not only in the form of fine-dispersed fractions, but also in the form of granules prepared from at least one component of the charge or from various combinations of its components. The granules may have various sizes and shapes; such as cylinders, disks, spheres, cubes, etc.

For producing diamond with a particle size of 0.05 to 5 μm, it is recommended that the graphite should be hexagonal graphite, rhombohedral graphite, colloidal graphite, and pyrolytic graphite.

For producing fine-dispersed fractions of diamond with a particle size of 0.01 to 1.0 μm it is advisable to use X-ray-amorphous forms of carbon, such as carbon black, vitreous coal coke, schungite, and sugar carbon.

As the starting boron nitride it is advisable to use its hexagonal modification or turbostratic form.

The present method envisages the use of a shell manufactured from a substance inert to the material to be transformed, that is soluble in water, acids and alkalies. A charge is enclosed in the shell before detonating it. The shell contributes to prolongation of the time of action of high pressures and temperatures on the material to be transformed upon detonation of the charge, this leading, e.g. in the case of boron nitride being used, to the formation of its high-temperature cubic structure modification. If the shell is made from such substances as salts of alkali metals, carbonates of alkali metals, oxides of metals, then, as a result of detonation, the shell is broken into the minutest particles which are easy to remove from the detonation products.

The present method envisages detonation of the charge in an atmosphere of air. It is expedient, however, that the charge detonation be effected in the medium of a gas inert to the target products, in the atmosphere of gaseous detonation products, or in a vacuum of 10$^{-4}$ to 10 mm Hg. With these conditions observed, the yield of the target product is increased, since interaction of the target product with air oxygen is precluded.

The essence of the invention resides in direct utilization of high dynamic pressures (preferably of 3 to 60 GPa) and high temperatures (preferably of 2000° to 6000° K.) developed in detonation of condensed explosives with a view to producing diamond and/or diamond-like modifications of boron nitride. The method is performed by detonating a charge consisting of an explosive and a material to be transformed, and also, when necessary, of additives which are inert to the material being transformed and to the target products. As said additives it is possible to use water, ice, liquid nitrogen, aqueous solutions of salts of metals, such as sodium chloride, calcium chloride; crystal hydrates, e.g. CuCl$_2$·2H$_2$O, CaCl$_2$·6H$_2$O; ammonium salts, e.g. ammonium chloride, ammonium nitrate, ammonium oxalate; hydrazine, hydrazine salts, e.g. hydrazine nitrate, hydrazine sulphate; aqueous solutions of hydrazine salts, such as hydrazine nitrate, hydrazine chloride; liquid hydrocarbons, e.g. octane, benzene, nitrobenzene; solid hydrocarbons, e.g. paraffin, polyethylene, rubber; metals or salts of metals having a density over 2.2 g/cm$^3$, e.g. copper, iron, calcium carbonate, barium chloride, and lead nitrate.

The above-cited inert additives make it possible to increase the yield of target products.

The present method envisages using materials to be transformed (carbon and boron nitride) in the form of various modifications, having various fractional compositions. The latter circumstance allows the obtaining target products also with various fractional compositions. Performing of the method with the use of various inert additives at various pressures and temperatures of detonation obtains target products of prescribed modifications: diamond—of cubic modification or in the form of a mixture of hexagonal (1 to 40%) and cubic (60 to 99%) modifications; boron nitride—of wurtzite modifications or as a mixture of cubic (1 to 80%) and wurtzite (20 to 99%) modifications.

The present invention makes it possible to use components of the charge both in the form of fine-dispersed fractions and in the form of granules prepared at least from one component of the charge or from various combinations of such components. The charge may be a mixture of components in the form of fine-dispersed fractions, or, in case of granules, the charge may
 be a mixture of a fine-dispersed fraction of an explosive with granules of a material to be transformed; or
consist of granules prepared from a mixture of an explosive with a material to be transformed and a fine-dispersed fraction of additives inert to the material to be transformed; or
consist of a fine-dispersed fraction of an explosive and granules prepared from a mixture of a material to be transformed with inert additives; or
consist of granules prepared from a mixture of an explosive, a material to be transformed and inert additives; etc.

Said granules may have various sizes and shapes: such as cylinders, disks, spheres, cubes, etc.

In the invention an embodiment of the method is envisaged, according to which a charge is preliminarily enclosed in the shell made of substance inert to a material to be transformed and soluble in water, acids and alkalies. Such a substance can be, e.g., sodium chloride, calcium carbonate, or lead oxide. The presence of a shell from said substance contributes to prolonging the time of action of high pressures and temperatures on the material being transformed upon detonation of a charge.

The charge detonation may be effected in an atmosphere of air, preferably in an atmosphere of a gas inert to the target products (e.g. in an atmosphere of nitrogen, hydrogen, argon), in an atmosphere of gaseous detonation products, or in a vacuum of $10^{-4}$ to 10 mm Hg.

PREFERRED EMBODIMENT OF THE INVENTION

Figure 1:
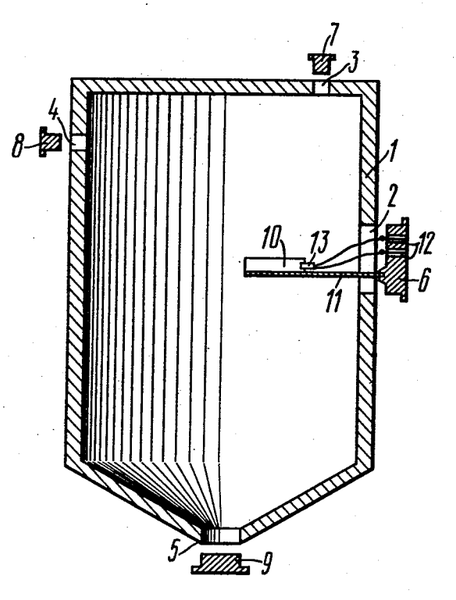

Given hereinbelow is a description of a preferred embodiment of the method of the invention, to be had in conjunction with the accompanying drawing, in which a steel container with a charge located therein are shown diagrammatically. Referring now to the drawing, in the walls of a steel container shown at 1 four openings 2, 3, 4 and 5 are made, provided with plugs 6, 7, 8 and 9. Opening 3 serves for filling container 1 with a gas inert to the target products. Opening 4 is intended for untightening container 1 after an explosion and for relieving excess pressure conditioned by the evolution of gaseous detonation products. Opening 5 is intended for discharging solid detonation products after one explosion or after several explosions. A charge 10 is mounted on a steel rod 11 (this rod may be made from some other material, such as wood or celluloid) secured in plug 6. In the same plug two electrical lead-ins 12 are secured, intended for attaching thereto wires of a detonator cap 13 installed in charge 10.

For the present method to be realized, in case of producing diamond, a mixture is prepared, consisting of 80 mass % of fine-dispersed hexogen and 20 mass % of oil furnace black with a specific surface of 15 m$^2$/g, and from the resulting mixture a charge is shaped which is a cylinder having a diameter of 40 mm and a density of 1.5 g/cm$^3$. The thus made charge 10 is secured on steel rod 11 made fast in plug 6. Detonator cap 13 is then inserted into the charge, and the detonator cap wires are connected to lead-ins 12. After that the charge is placed into container 1 and plug 6 is tightened. Said container is fit for multiple use (thousands and dozens of thousands of times). Through opening 3 liquid nitrogen is poured into the container with opening 5 being closed with plug 9. The liquid nitrogen evaporates at the bottom of container 1, and the resulting gaseous nitrogen displaces air from the container through openings 3 and 4. Then plugs 7 and 8 are made tight, and charge 10 is detonated by applying voltage to lead-ins 12. Then opening 4 is unplugged, and the pressure in the container is equalized with the atmosphere. After that, through opening 5 solid detonation products are discharged, these products comprising diamond, non-converted carbon, fragments of the detonator cap, moisture, and absorbed gaseous detonation products. Solid detonation products are treated with boiling nitric acid for the detonator cap fragments to be dissolved. Then the solid detonation products are washed with water and treated with boiling perchloric acid till complete dissolution of the unconverted carbon. The diamond remains unchanged. The insoluble precipitate is separated by centrifugation and treated with a boiling solution of sodium hydroxide to remove silicate impurities. The precipitate is washed with water and dried. The yield of diamond is 17% of the amount of the initial black. The resultant product is a powder with a specific surface of 35 m$^2$/g, particle size of 0.01 to 1.0 μm, fully consisting of particles of cubic-modification diamond. According to the X-ray analysis data, the diamond particles are characterized by the size of coherent scattering areas equal to 150 Å and by crystal lattice microdistortions of the second order $\Delta a/a < 5 \cdot 10^{-4}$. Concentration of paramagnetic centers is $1.05 \cdot 10^{19} g^{-1}$ (ESR data).

For the present method to be realized, where diamond-like modifications of boron nitride are to be produced, 25 mass % of hexagonal boron nitride with a particle size less than 10 μm is mixed with 75 mass % of fine-dispersed hexogen, and from the mixture thus prepared a cylindrical charge is shaped having a diameter of 30 mm and a density of 1.75 g/cm$^3$. The resulting charge 10 is secured on steel rod 11 made fast on plug 6. Detonator cap 13 is inserted into the charge, and the detonator cap wires are connected to lead-ins 12. Then the charge is placed into container 1 and plug 6 is tightened. Further plug 9 is tightened in opening 5, and through opening 3 the container is filled with gaseous nitrogen. Then plugs 7 and 8 are tightened in openings 3 and 4 respectively and, by applying voltage to lead-ins 12, charge 10 is detonated. By removing the plug from opening 4, the pressure in the container is equalized with the atmospheric pressure, and through opening 5 solid detonation products are discharged from the container, comprising diamond-like modifications of boron nitride, non-converted hexagonal boron nitride, fragments of the detonator cap, moisture, absorbed gaseous detonation products, and an admixture of free carbon. Solid detonation products are treated with boiling perchloric acid until complete dissolution of free carbon. Then solid detonation products are treated in succession with boiling nitric acid and boiling perchloric acid to remove the detonator cap fragments and free carbon. The insoluble residue is treated with a mixture of concentrated sulphuric acid and sodium fluoride (mass ratio 20:3 respectively) at a temperature of 200° C. to remove the non-converted boron nitride. The residue is isolated, washed with water and dried at a temperature of 100° C. The product thus obtained is a mixture of cubic and wurtzite modifications of boron nitride (70 mass % and 30 mass % respectively). The total yield of diamond-like modifications of boron nitride is 15% of the initial hexagonal boron nitride. The resulting product is a powder with a density of 3.20 g/cm$^3$, consisting of particles having a size of 0.05 to 3.0 μm.

The present method obtains diamond and diamond-like modifications of boron nitride in the form of powders having the following properties:

| Diamond | |
|---|---|
| Particle size, μm | |
| graphite | 0.05–5.0 |
| black | 0.01–1.0 |
| Specific surface, m$^2$/g | 10–120 |
| Density, g/cm$^3$ | 3.15–3.40 |
| Bulk weight, g/cm$^3$ | 0.35–1.0 |
| Size of coherent scattering areas, Å | 85–200 |
| Crystal lattice microdistortions of the second order, Δa/a | $0$–$2.5 \cdot 10^{-3}$ |
| Concentration of paramagnetic centers, g$^{-1}$: | |
| graphite | $(1.5$–$4.5) \cdot 10^{19}$ |
| black | $(1.0$–$1.3) \cdot 10^{19}$ |
| Thermal stability in vacuum during 30 minutes, °C. | over 800 |
| Weight losses on heating in vacuum to 800° C., mass % | up to 5.0 |
| Diamond-like Modifications of Boron Nitride | |
| Particle size, μm | 0.05–5.0 |
| Density, g/cm$^3$ | 3.15–3.30 |
| Phase composition, %: | |
| cubic boron nitride | 0–80 |
| wurtzite boron nitride | 20–100 |

For a better understanding of the present invention given hereinbelow are examples of its specific embodiment. In all cases the yield of the target product is given in per cent of the mass of a mixture consisting of the target product and non-converted starting material (15 to 20 mass % of the initial material to be transformed is oxidized during the charge detonation).

EXAMPLE 1

A charge is shaped from a mixture consisting of 80 mass % of fine-dispersed hexogen and 20 mass % of hexagonal graphite with a particle size less than 300 μm. The charge is placed at the center of a container filled with nitrogen. The container is tightened, the charge is detonated, and solid detonation products are discharged, consisting of diamond, non-converted carbon, fragments of a detonator cap, moisture, and absorbed gaseous detonation products. The solid detonation products are treated in succession with boiling nitric acid and boiling perchloric acid to remove admixtures and non-converted carbon. The residue is treated with a boiling solution of an equimolar mixture of sodium hydroxide and potassium hydroxide to dissolve silicate admixtures. The precipitate is separated by centrifugation, washed with water and dried at a temperature of 130° C.

The resulting product is a diamond powder consisting of a mixture of 25 mass % of hexagonal modification (lonsdaleite) and 75 mass % of cubic modification. The size of powder particles is 0.1 to 3.0 μm. Pycnometric density is 3.25 g/cm$^3$. Concentration of paramagnetic centers is $2.0 \cdot 10^{19}$ g$^{-1}$. The total yield of said modifications of diamond is 1.5 mass %.

EXAMPLE 2

A charge is shaped from 1.5 kg of a mixture consisting of 66 mass % of fine-dispersed hexogen, 17 mass % of hexagonal graphite with particle size of 40 to 250 μm, and 17 mass % of water. Operations are carried out as described in Example 1. Average dynamic pressure in the detonation wave front upon detonation of the charge is 8 GPa, average temperature is about 3000° K.

The resulting product is a diamond powder consisting of a mixture of cubic and hexagonal modifications (60 and 40 mass % respectively). The properties of the obtained product are similar to those of the product obtained as described in Example 1. The total yield of said modifications of diamond is 2.0 mass %.

EXAMPLE 3

From a mixture consisting of 75 mass % of fine-dispersed hexogen and 25 mass % of glass carbon (size of glass carbon particles is 10 to 300 μm) a charge is shaped, having a density of 1.1 g/cm$^3$. The charge is detonated and subsequent operations are performed as described in Example 1. The resulting product is a diamond powder of cubic modification with a particle size of 0.1 to 5.0 μm, specific surface of 40 m$^2$/g, density of 3.15 g/cm$^3$. On heating lin vacuum at a temperature of 800° C. the diamond loses 5 mass % of volatile admixture, but its crystal structure remains unchanged. The yield of diamond is 1.7 mass %.

EXAMPLE 4

From a mixture of 990 g of fine-dispersed hexogen and 10 g of Ceylon graphite with a particle size of 50 to 200 μm, containing about 15–20% of rhombohedral modification a charge with a density of 1.0 g/cm$^3$ is shaped. The charge is detonated and subsequent operations are performed as described in Example 1.

The resulting product is a diamond powder, consisting of 70% of cubic and 30% of hexagonal modifications. The properties of the diamond are similar to those of the diamond described in Example 1. The total yield of said modifications of diamond is 5.0%.

EXAMPLE 5

From a mixture consisting of 85.7 mass % of fine-dispersed PETN and 14.3 mass % of hexagonal boron nitride with particle size less than 10 μm, a charge is shaped. Upon detonation a dynamic pressure of 30 GPa and a temperature of about 5000° K. are developed in the detonation wave front. The charge is placed at the center of a container and a vacuum of 10 mm Hg is created in it. The charge is detonated and solid detonation products are then extracted from the container. These solid detonation products are a mixture of wurtzite modification of boron nitride, boron oxide, detonator fragments, moisture, absorbed gaseous detonation products, and admixtures of free carbon. The solid detonation products are treated in succession with boiling nitrid acid and boiling perchloric acid to remove the detonator fragments and free carbon, respectively, as well as to remove boron oxide and absorbed gaseous detonation products. Then the residue is treated with a mixture of concentrated sulphuric acid and sodium fluoride (in a mass ratio of 20:3 respectively) at a temperature of 200° C. to dissolve the non-converted hexagonal boron nitride. The insoluble residue is separated, washed with water, and dried at a temperature of 100° C.

The product thus obtained is wurtzite modification of boron nitride with a particle size of 0.05 to 5.0 μm and a density of 3.15 g/cm$^3$. The yield of the product is 2.0%.

EXAMPLE 6

From a mixture consisting of 30 mass % of fine-dispersed hexogen and 70 mass % of hexagonal boron nitride with a particle size less than 10 μm a charge is shaped. Upon detonation a dynamic pressure of 3 GPa and a temperature of about 2000° K. originate in the detonation wave front. The charge is detonated in an atmosphere of argon. Subsequent operations of isolating the target product from solid detonation products are similar to those described in Example 5.

The resulting product is wurtzite modification of boron nitride with properties similar to those of the product obtained in Example 5. The yield of the product is 1.5%.

EXAMPLE 7

From a mixture consisting of 91 mass % of fine-dispersed hexogen and 9 mass % of spherical granules of 0.5 to 1.0 mm in diameter, consisting of 50 mass % of hexagonal boron nitride with particle size less than 5 μm and 50 mass % of ammonium chloride with a particle size of 1 to 100 μm a charge is shaped with an average density of 1.6 g/cm$^3$. The charge is detonated in the atmosphere of gaseous detonation products, which have formed upon preliminary detonation of an identical charge. Subsequent operations are similar to those described in Example 5.

The resulting powder-like product is a mixture of cubic and wurtzite modifications of boron nitride (30 and 70 mass % respectively). The powder has a particle size of 0.5 to 3.0 μm and density of 3.30 g/cm$^3$. The total yield of diamond-like modifications of boron nitride is 3.3%.

EXAMPLE 8

A mixture of paraffin, powdered copper (having a density of 8.9 g/cm$^3$) with a particle size less than 40 μm, and natural hexagonal graphite with a particle size less than 500 μm with the mass ratio thereof of 1:1:1 is granulated, the result being spherical granules with a diameter about 1 mm. From a mixture consisting of 85.7 mass % of fine-dispersed hexogen and 14.3 mass % of said granules a cylindrical charge is shaped. The charge detonation and subsequent operations are performed by following a procedure similar to that described in Example 1.

The resulting product is a mixture of 40% of hexagonal and 60% of cubic modifications of diamond. The size of the powder particles is 1 to 5 μm, specific surface is 10 m$^2$/g, and density is 3.40 g/cm$^3$. The total yield of said modifications of diamond is 3.5 mass %.

EXAMPLE 9

A charge is shaped from a mixture of 1.0 kg of fine-dispersed hexogen and 0.2 kg of cylindrical granules consisting of 80 mass % of powdered iron (having a density of 7.8 g/cm$^3$) with a particle size less than 40 μm and 20 mass % of hexagonal graphite with particle size less than 40 μm, particle diameter of 5 mm and height of 5 mm. The charge is detonated in an atmosphere of air. Operations for isolating the target product from solid detonation products are similar to those described in Example 1.

The product thus obtained is a mixture of 70% of cubic and 30% of hexagonal modifications of diamond. The properties of the resulting diamond are similr to those of the diamond obtained in Example 8. The total yield of said modifications of diamond is 5.0%.

EXAMPLE 10

A charge having a density of 1.1 g/cm$^3$ is shaped from a mixture consisting of 10 mass % of oil furnace black with a specific surface of 15 m$^2$/g and 90 mass % of cylindrical granules having a diameter of 3 mm and a height of 10 mm, consisting of 95 mass % of fine-dispersed hexogen and 5 mass % of paraffin. The charge detonation and target product isolation operations are similar to those described in Example 1.

The resulting product is a diamond powder of cubic modification with a specific surface of 35 m$^2$/g, particle size of 0.01 to 1.0 μm, size of coherent scattering areas of 150 Å, crystal lattice microdistortions of the second kind of about $1 \cdot 10^{-3}$, concentration of paramagnetic centers of $1.3 \cdot 10^{19}$ g$^{-1}$. The yield of diamond is 3.5%.

EXAMPLE 11

A charge is shaped from a mixture consisting of 75 mass % of trinitrotoluene with a particle size less than 200 μm, 24 mass % of hexagonal boron nitride with a particle size less than 3 μm, and 1 mass % of hydrazine. The charge detonation is performed in a vacuum of 10 mm Hg. The target product isolation operations are performed by following a procedure similar to that described in Example 5.

The resulting product is a boron nitride powder of wurtzite modification with particle size of 0.1 to 1.0 μm and density of 3.20 g/cm$^3$. The yield of the product is 2.7%.

EXAMPLE 12

A charge having a density of 1.55 g/cm$^3$ is shaped from a mixture consisting of 75 mass % of fine-dispersed hexogen, 12.5 mass % of hexagonal boron nitride with a particle size less than 10 μm, and 12.5 mass % of copper dichloride dihydrate with a particle size less than 1 μm.

The charge is detonated in an atmosphere of air. Solid detonation products consisting of wurtzite and hexagonal modifications of boron nitride, detonator fragments, copper dichloride decomposition products, moisture, absorbed gaseous detonation products and an admixture of free carbon are treated with boiling nitric acid to remove the detonator fragments and the copper dichloride decomposition products, washed with water, dried, and treated with a mixture of concentrated sulphuric acid and sodium fluoride (in a mass ratio of 20:3 respectively) at a temperature of 200° C. to dissolve the non-converted hexagonal boron nitride. The residue is separated, washed with water and dried at a temperature of 100° C.

The resulting product is a wurtzite modification of boron nitride. The properties of the product are similar to those of the product obtained as described in Example 11. The yield of the diamond-like modification of boron nitride is 3.5%.

EXAMPLE 13

A charge having a density of 1.2 g/cm$^3$ is shaped from a mixture consisting of 75 mass % of fine-dispersed hexogen, 15 mass % of pyrolytic carbon with a particle size less than 200 μm, and 10 mass % of a saturated aqueous solution of hydrazine nitrate. The charge detonation and subsequent operations are performed in a manner similar to that described in Example 1.

The resulting product is a diamond powder having a composition and properties similar to those of the powder described in Example 4. The yield of diamond is 4.0%.

EXAMPLE 14

A cylindrical charge of 40 mm diameter and having a density of 1.4 g/cm$^3$ is shaped from a mixture consisting of 70 mass % of tetryl with a particle size less than 300 μm, 20 mass % of oil furnace black with a specific surface of 15 m$^2$/g, and 10 mass % of octane. The charge is detonated in an atmosphere of hydrogen. Subsequent operations are similar to those described in Example 1.

The powder-like product thus obtained is a diamond of cubic modification. The density of the powder is 3.23 g/cm$^3$; specific surface, 40 m$^2$/g; concentration of paramagnetic centers, about $1.2 \cdot 10^{19}$ g$^{-1}$; size of coherent scattering areas, 160 Å. The yield of diamond is 5.0%.

EXAMPLE 15

A flat charge having a thickness of 5 mm, width of 100 mm and length of 200 mm is shaped from a mixture consisting of 80 mass % of octogen with a particle size less than 500 μm, 10 mass % of schungite with a particle size less than 100 μm, and 10 mass % of isoprene rubber. The charge detonation and subsequent operations are performed in a manner similar to that described in Example 1.

The product thus obtained is a diamond powder of cubic modification, with properties similar to those of the diamond produced in Example 14. The yield of diamond is 5.5%.

EXAMPLE 16

A charge having a density of 1.5 g/cm$^3$ is shaped from a mixture consisting of 80 mass % of fine-dispersed hexogen, 10 mass % of thermal oil black with a specific surface of 75 m$^2$/g, and 10 mass % of a saturated aqueous solution of sodium chloride. The charge detonation and subsequent operations are performed in a manner similar to that described in Example 1.

The resulting product is cubic diamond powder with a specific surface of 77 m$^2$/g. The thermal stability of the diamond thus produced exceeds 800° C. The yield of diamond is 3.0%.

EXAMPLE 17

A charge having a density of 1.5 g/cm$^3$ is shaped from a mixture consisting of 80 mass % of fine-dispersed hexogen, 10 mass % of thermal oil black with a specific surface of 75 m$^2$/g, and 10 mass % of a 40% aqueous solution of calcium chloride. The charge detonation and subsequent operations are performed by following a procedure similar to that described in Example 1.

The product thus obtained is similar in its properties to the diamond obtained in Example 16. The yield of diamond is 3.0%.

EXAMPLE 18

A charge having a density of 1.8 g/cm$^3$ is shaped from a mixture consisting of 60 mass % of fine-dispersed hexogen, 10 mass % of hexagonal boron nitride with a particle size less than 10 μm, and 30 mass % of calcium chloride hexahydrate. The charge detonation and subsequent operations are performed in a manner similar to that described in Example 12.

The properties of the resulting product which is a wurtzite modification of boron nitride are similar to those of the product obtained in Example 12. The yield of wurtzite modification of boron nitride is 4.0%.

EXAMPLE 19

A charge having a density of 1.2 g/cm$^3$ is shaped from a mixture consisting of 75 mass % of fine-dispersed hexogen, 15 mass % of pyrolytic graphite with a particle size less than 200 μm, and 10 mass % of hydrazine nitrate. The charge detonation and subsequent operations are performed in a manner similar to that described in Example 1.

The resulting product is a diamond powder, having a composition and properties similar to those of the powder described in Example 4. The yield of diamond is 5.0%.

EXAMPLE 20

A charge having a density of 1.2 g/cm$^3$ is shaped from a mixture consisting of 75 mass % of fine-dispersed hexogen, 15 mass % of pyrolytic graphite with a particle size less than 200 μm, and 10 mass % of hydrazine sulphate. The charge detonation and subsequent operations are performed in a manner similar to that described in Example 1.

The resulting product is a diamond powder, having a composition and properties similar to those of the product described in Example 4. The yield of diamond is 4.5%.

EXAMPLE 21

A charge having a density of 1.2 g/cm$^3$ is shaped from a mixture consisting of 75 mass % of fine-dispersed hexogen, 15 mass % of pyrolytic graphite with particle size less than 200 μm, and 10 mass % of a 40% aqueous solution of hydrazine chloride. The charge detonation and subsequent operations are performed in a manner similar to that described in Example 1.

The product thus obtained is a diamond powder, in its composition and properties similar to that described in Example 4. The yield of diamond is 3.5%.

EXAMPLE 22

A charge having a density of 1.6 g/cm$^3$ is shaped from a mixture consisting of 75 mass % of fine-dispersed hexogen, 17 mass % of hexagonal graphite, and 18 mass % of iron with a particle size of 40 to 200 μm. The charge detonation and subsequent operations are performed in a manner similar to that described in Example 1.

The resulting product is a diamond powder of cubic modification with a bimodal distribution of particle size:

0.05 to 0.05 μm (30 rel. %) and 1.0 to 5.0 μm (70 rel. %). The concentration of paramagnetic centers is about $4.5 \cdot 10^{19}$ g$^{-1}$. The yield of diamond is 6.5%.

EXAMPLE 23

From a mixture consisting of 80 mass % of fine-dispersed hexogen and 20 mass % of turbostratic boron nitride with a particle size less than 10 μm, a cylindrical charge with a diameter of 40 mm is shaped, this charge being enclosed in a 20 mm-thick shell from sodium chloride. The charge is detonated in a vacuum of $10^{-1}$ mm Hg. Subsequent operations are performed in a manner similar to that described in Example 5.

The resulting product is a powder, consisting of 80% of cubic and 20% of wurtzite modifications of boron nitride. The yield of diamond-like modifications of boron nitride is 15%. The properties of the powder are similar to those of the product obtained in Example 7.

EXAMPLE 24

From a mixture consisting of 80 mass % of octogen with particle size less than 300 μm and 20 mass % of sugar carbon with a particle size less than 300 μm a cylindrical charge with a diameter of 30 mm is shaped, this charge being then enclosed in a shell from pressed calcium carbonate, having a thickness of 25 mm. The charge detonation and subsequent operations are performed in a manner similar to that described in Example 1.

The resulting powder-like product is cubic modification of diamond with a particle size of 0.1 to 2.0 μm, density of 3.3 g/cm$^3$, size of coherent scattering areas of 130 Å, crystal lattice microdistortions of the second kind less than $5 \cdot 10^{-4}$, concentration of paramagnetic centres of $1.35 \cdot 10^{19}$ g$^{-1}$. The yield of diamond is 13.1%.

EXAMPLE 25

From a mixture consisting of 79 mass % of fine-dispersed hexogen and 21 mass % of special-purity hexagonal graphite with a particle size less than 100 μm a cylindrical charge is shaped, having a diameter of 30 mm and a density of 1.58 g/cm$^3$, said charge being then enclosed in a 20 mm-thick shell from sodium chloride. The charge detonation and subsequent operations are performed in a manner similar to that described in EXAMPLE 1.

The resulting product is a diamond powder of cubic modification with a particle size of 0.05 to 5.0 μm, specific surface of 32 m$^2$/g, density of 3.40 g/cm$^3$, size of coherent scattering areas of 85 Å, crystal lattice microdistortions of the second kind of $1.5 \cdot 10^{-3}$, concentration of paramagnetic centres of $1.5 \cdot 10^{19}$ g$^{-1}$. The yield of diamond is 15.1%.

EXAMPLE 26

A cylindrical charge having a density of 1.65 g/cm$^3$ and a diameter of 30 mm is shaped from a mixture consisting of 83 mass % of fine-dispersed hexogen and 17 mass % of hexagonal boron nitride with a particle size less than 10 μm. The charge is then enclosed in a shell from pressed lead oxide, having a thickness of 10 mm. The charge is detonated in an atmosphere of nitrogen. Solid detonation products are treated with boiling perchloric acid to complete removal of free carbon. Then the residue is treated with boiling nitrite acid to dissolve detonator cap fragments and lead oxides. The insoluble residue is treated with a mixture of concentrated sulphuric acid and sodium fluoride (in a mass ratio of 20:3 respectively) at a temperature of 200° C. to dissolve the non-converted hexagonal boron nitride. The precipitate is separated, washed with water and dried at a temperature of 100° C.

The resulting product is a mixture of cubic and wurtzite modifications of boron nitride. Said product in its composition and properties is similar to the product obtained in Example 23. The total yield of diamond-like modifications of boron nitride is 16%.

EXAMPLE 27

A charge having a density of 1.5 g/cm$^3$ is shaped from a mixture of 150 g of fine-dispersed hexogen with a particle size less than 100 μm and 50 g of colloidal graphite. The charge detonation and subsequent operations are performed in a manner similar to that described in Example 1.

The resulting product is a powder of diamond with a specific surface of 120 g/m$^2$, size of coherent scattering areas of 130 Å, crystal lattice microdistortions of the second kind less than $5 \cdot 10^{-4}$, a concentration of paramagnetic centers of $1.35 \cdot 10^{19}$ g$^{-1}$. The yield of diamond is 10%.

EXAMPLE 28

A cylindrical charge having a diameter of 40 mm is shaped from a mixture consisting of 75 mass % of fine-dispersed hexogen and 25 mass % of black produced by thermal electrocracking from gas and having a specific surface of 20 m$^2$/g. The charge detonation and subsequent operations are performed in a manner similar to that described in Example 1.

The product thus obtained is a diamond powder of cubic modification with a specific surface of 35 m$^2$/g, size of coherent scattering areas of 170 Å, crystal lattice microdistortions of the second kind less than $5 \cdot 10^{-4}$, concentration of paramagnetic centers of $1.13 \cdot 10^{19}$ g$^{-1}$. The yield of diamond is 8.5%.

EXAMPLE 29

A charge having a density of 1.5 g/cm$^3$ is shaped from a mixture consisting of 75 mass % of fine-dispersed hexogen and 25 mass % of refinery coke with a particle size less than 350 μm, heat-treated at 1300° C. The charge detonation and subsequent operations are performed as in Example 1.

The resulting product is a diamond powder of cubic modification with a particle size of 0.3 to 3.0 μm, density of 3.27 g/cm$^3$, and the size of coherent scattering areas is 120 Å. The yield of diamond is 12.3%.

EXAMPLE 30

A cylindrical charge having a density of 1.6 g/cm$^3$ is shaped from a mixture consisting of 83 mass % of fine-dispersed hexogen and 17 mass % of spectrally pure hexagonal graphite. The charge is detonated in a vacuum of $10^{-4}$ mm Hg. Subsequent operations are performed by following a procedure similar to that described in Example 1.

The resulting product is a diamond powder of cubic modification, the properties of which are similar to those of the product obtained as described in Example 25. The yield of diamond is 20%.

EXAMPLE 31

A disk-shaped charge of 60 mm in diameter and having a thickness of 30 mm is prepared from a mixture consisting of 79 mass % of fine-dispersed hexogen and 21 mass % of hexagonal boron nitride with a particle size less than 10 μm. The charge is detonated in an atmosphere of nitrogen, with simultaneous initiation by two detonator caps arranged at the opposite end faces of the disk and axially thereto. At the collision boundary opposite detonation waves a dynamic pressure exceeding 60 GPa and a temperature of about 6000° K. is developed. Subsequent operations are performed in a manner similar to that described in Example 5.

The product thus obtained is a powder mixture of cubic and wurtzite modifications of boron nitride (70% and 30% respectively). The particle size of the powder is within 0.05 to 3.0 μm, density is 3.3 g/cm³. The total yield of diamond-like modifications of boron nitride is 15.0%.

EXAMPLE 32

750 g of hexogen is dissolved in dimethyl formamide and 250 g of oil furnace black having a specific surface of 15 m²/g is dispersed in the resulting solution. The suspension thus obtained is poured into a 10-fold quantity of water. The precipitated mixture of recrystallized hexogen with a particle size less than 10 μm and black is filtered off and dried. From the resulting mixture a cylindrical charge having a diameter of 40 mm and a density of 1.5 g/cm³ is shaped. The charge detonation and subsequent operations are performed by following a procedure similar to that used in Example 1.

The resulting product is a diamond powder of cubic modification, having a specific surface of 59 m²/g, size of coherent scattering areas of 200 Å, crystal lattice microdistortions of the second kind less than $5 \cdot 10^{-4}$, and concentration of paramagnetic centers of about $1.25 \cdot 10^{19}$ g$^{-1}$. The yield of diamond is 19.3%.

EXAMPLE 33

A tubular charge having a diameter of 100 mm, tube wall thickness of 10 mm, and a density of 1.6 g/cm³ is shaped from a mixture consisting of 450 g of fine-dispersed hexogen, 75 g of spectrally pure hexagonal graphite with a particle size less than 200 μm, and 75 g of hexagonal boron nitride with a particle size less than 10 μm. The charge is detonated in an atmosphere of nitrogen. Solid detonation products are a mixture of diamond and diamond-like modifications of boron nitride, boron oxide, boron carbide, detonator fragments, moisture, and absorbed gaseous detonation products. Solid detonation products are treated with boiling nitric acid and with boiling perchloric acid in succession to remove the detonator fragments, boron oxide, non-diamond forms of carbon, and gaseous detonation products. The insoluble residue is treated with a mixture of concentrated sulphuric acid and sodium fluoride (in a mass ratio of 20:3 respectively) at a temperature of 200° C., then separated, washed and dried.

The resulting product is a mixture of cubic modification of diamond, cubic modification of boron nitride and wurtzite modification of boron nitride in a mass ratio of 70:20:10 respectively. The total yield of said modifications of the product is 15%.

EXAMPLE 34

A flat charge of 30 mm thickness, 60 mm in width and 200 mm length, having a density of 1.7 g/cm³ is shaped from a mixture consisting of 75 mass % of fine-dispersed hexogen, 20 mass % of spectrally pure hexagonal graphite with a particle size less than 40 μm, and 5 mass % of ammonium nitrate. The charge detonation and subsequent operations are performed in a manner similar to that described in Example 1.

The resulting product is a diamond powder of cubic modification with properties similar to those of the diamond powder produced as described in Example 25. The yield of diamond is 22%.

EXAMPLE 35

A flat charge of 15 mm thickness, 30 mm width and 150 mm length is shaped from a mixture consisting of 80 mass % of fine-dispersed hexogen and 20 mass % of black obtained in a diffusion flame and having a specific surface of 200 m²/g. The charge detonation and subsequent operations are performed by following a procedure similar to that described in Example 1.

The resulting product is a diamond powder of cubic modification with an average particle size of 150 μm and the size is coherent scattering areas of 140 Å. The yield of diamond is 10%.

EXAMPLE 36

A charge having a density of 1.2 g/cm³ is shaped from a mixture consisting of 75 mass % of fine-dispersed hexogen and 25 mass % of natural hexagonal graphite with a particle size less than 400 μm. The charge thus prepared is impregnated with liquid nitrogen, in an amount of 10% of the charge mass. The charge detonation and subsequent operations are performed in a manner similar to that described in Example 1.

The product thus obtained is a diamond powder, consisting of 70% of cubic and 30% of hexagonal modifications. The magnitude of the crystal lattice microdistortions of the second kind for the cubic modification in this product is $2 \cdot 10^{-3}$. The specific surface of the powder is 30 m²/g. The total yield of said modifications of diamond is 5.0%.

EXAMPLE 37

A cylindrical charge of 40 mm diameter is shaped from a mixture consisting of 60 mass % of tetranitromethane, 20 mass % of oil furnace black having a specific surface of 15 m²/g, and 20 mass % of nitrobenzene. The charge detonation and subsequent operations are performed in a manner similar to that described in Example 1. The dynamic pressure and temperature originating as a result of detonation of the charge of said composition are 12 GPa and 5000° K. respectively.

The product thus obtained is a diamond powder of cubic modification, similar in its properties to the diamond powder produced as described in Example 32. The yield of diamond is 15%.

EXAMPLE 38

Granules having a diameter of 5 mm, consisting of 80 mass % of fine-dispersed hexogen, 15 mass % of spectrally pure hexagonal graphite with a particle size less than 100 μm, and 5 mass % of polyethylene with a particle size less than 100 μm are mixed in a mass ratio of 3:1 with hexogen having a particle size less than 0.5 mm, and from the mixture thus prepared a charge is shaped, having an average density of 1.6 g/cm³. The charge detonation and subsequent operations are performed by following a procedure similar to that described in Example 1.

The resulting product is a diamond powder of cubic modification with properties similar to those of the diamond powder obtained as described in Example 30. The yield of diamond is 21%.

EXAMPLE 39

A charge having a density of 1.45 g/cm$^3$ is shaped from a mixture consisting of 15 mass % of oil furnace black with a specific surface of 15 m$^2$/g, 80 mass % of fine-dispersed hexogen, and 5 mass % of benzene. The charge detonation and subsequent operations are performed in a manner similar to that described in Example 1.

The resulting product is a diamond powder of cubic modification, analogous in its properties to the product obtained as described in Example 14. The yield of diamond is 8%.

EXAMPLE 40

A cylindrical charge of 40 mm diameter is shaped from a mixture consisting of 40 mass % of fine-dispersed hexogen, 10 mass % of hexagonal boron nitride with particle size less than 10 μm, and 50 mass % of barium chloride (density of 3 g/cm$^3$) with a particle size less than 500 μm. The charge detonation and subsequent operations are performed by following a procedure similar to that described in Example 12.

The obtained product is a wurtzite modification of boron nitride with properties similar to those of the product obtained in Example 12. The yield of wurtzite modification of boron nitride is 5.0%.

EXAMPLE 41

A cylindrical charge of 40 mm diameter and having a density of 1.70 g/cm$^3$ is shaped from a mixture consisting of 30 mass % of fine-dispersed PETN and 70 mass % of glass carbon in the form of granules that are plates having a thickness of 1 mm and an average linear size of about 8 mm. The charge detonation and subsequent operations are performed in a manner similar to that described in Example 1.

The resulting product is a diamond powder of cubic modification. The yield of the product is 1.0%.

EXAMPLE 42

A cylindrical charge of 40 mm diameter and having a density of 1.3 g/cm$^3$ is shaped from a mixture consisting of 80 mass % of fine-dispersed hexogen, 1 mass % of turbostratic boron nitride (density, 2.9 g/cm$^3$). The charge is detonated under a vacuum of 1 mm Hg. Subsequent operations are performed as described in Example 5.

The resulting product is a boron nitride powder of wurtzite modification with properties similar to those of the product obtained in Example 5. The yield of the product is 3.5%.

INDUSTRIAL APPLICABILITY

Superhard materials produced by the method proposed herein can be used both as abrasives and as starting materials in the production of polycrystalline compacts from which cutting tools are manufactured.

What is claimed is:

1. A method for producing diamond and/or diamond-like modifications of boron nitride by detonating in a container, a charge of a particulate admixture of an explosive and the material to be transformed, said material to be transformed selected from the group consisting of:
   (a) carbon to produce diamond,
   (b) boron nitride to produce diamond-like modifications of boron nitride, and
   (c) carbon and boron nitride to produce a mixture of diamond and diamond-like modifications of boron nitride;

wherein said explosive upon detonation produces dynamic pressures varying from about 3 to 60 GPa and temperatures varying from about 2,000° to 6,000° K.

2. The method claim 1, wherein the material transformed is carbon.

3. The method of claim 1, wherein the material transformed is boron nitride.

4. The method of claim 1, wherein the material transformed is a mixture of carbon and boron nitride.

5. The method of claim 1, wherein the charge contains 30 to 99 wt. % of an explosive and 1 to 70 wt. % of the material to be transformed.

6. The method of claim 1, wherein said charge also includes additives inert to the material to be transformed, which evaporate and decompose beyond the front of a detonation wave, in an amount of 1 to 50% by weight of the charge.

7. The method of claim 6, wherein the inert additives are selected from the group consisting of water, dry ice, liquid nitrogen, aqueous solutions of metal salts, crystal hydrates, ammonium salts, hydrazine, hydrazine salts, aqueous solutions of hydrazine salts, and liquid or solid hydrocarbons.

8. The method of claim 1, wherein before detonation, the charge is enclosed in a shell made of a substance inert to the material to be transformed and soluble in water, acids or alkalis.

9. The method of claim 1, wherein the charge is detonated in an atmosphere of a gas inert to the transformed material, or an atmosphere of gaseous detonation products, or in a vacuum of $10^{-4}$ to 10 mm Hg.

* * * * *